Patented Oct. 11, 1938

2,132,442

UNITED STATES PATENT OFFICE 2,132,442

SYNTHETIC RESINS

Henry S. Rothrock, Wilmington, Del., assignor to E. I. du Pont de Nemours & Company, Wilmington, Del., a corporation of Delaware No Drawing. Application April 9, 1936, Serial No. 73,588

10 Claims. (Cl. 260—8)

This invention relates to synthetic resins, and more particularly to improved polyhydric alcohol-polybasic acid resins of low acid number which are soluble in ordinary solvents for such resins.

Although polybasic acid-polyhydric alcohol resins are of the greatest importance and utility in the paint and varnish arts, many of these resins are open to the objection that because of their relatively high acidity they cannot be used satisfactorily for many pigmented coating compositions on account of their tendency to react with basic pigments, a phenomenon which often leads to objectionable bodying or "livering". Resins of the polybasic acid-polyhydric alcohol type which contain relatively small amounts of fatty oil cannot ordinarily be prepared with acid numbers less than about 40 unless excess polyhydric alcohol is used, because if heated long enough to reduce the acidity still further, they are converted to insoluble, useless masses. The use of excess polyhydric alcohol, while accomplishing reduction in acidity, leads to water sensitivity.

It has long been an object of the resin art to produce short-oil polybasic acid-polyhydric alcohol resins of good water resistance having low acid numbers and soluble in the usual solvents, but heretofore very little has been accomplished in this direction. For example, it has been proposed to reduce the acidity of polybasic acid-polyhydric alcohol resins by treating them with certain amines, but the resins so produced contain aromatic amino residues which are prone to discoloration and the resins themselves are frequently inhomogeneous and are not sufficiently soluble in the usual polybasic acid-polyhydric alcohol solvents to be used satisfactorily in coating compositions. It has also been proposed to reduce the acidity of polybasic acid-polyhydric alcohol resins by decarboxylation with copper compounds, but the products obtained in this way are usually dark colored and are difficult to reproduce. It has been found practicable to produce long-oil polybasic acid-polyhydric alcohol resins of low acidity by prolonged heating, but no one, to my knowledge, has heretofore succeeded in making short-oil polybasic acid-polyhydric alcohol resins of low acidity which have satisfactory color, water resistance and solubility in the usual resin solvents.

Processes are also known for dissolving polyhydric alcohol-polybasic acid resins of high acidity in dilute aqueous ammonia in the cold, after which acid is added and the resulting slurry treated with formaldehyde in the cold. In one instance, free polyhydric alcohol is added to the ammoniacal solution and films laid down therefrom are hardened with formaldehyde. However, all those processes which involve the dissolving of the resin in dilute aqueous ammonia at low temperatures result in the formation of the aqueous solution of the ammonium salt of the resin which, on being heated or treated with acid or formaldehyde or any combination thereof, loses ammonia, a resin substantially unchanged in acidity from the original resin being precipitated. Simple heating drives off the ammonia as a gas; acid treatment removes it as an ammonium salt; and formaldehyde removes it as hexamethylenetetramine. If the resin is first precipitated by acid or by heating, subsequent formaldehyde treatment serves only to remove the last traces of ammonia. In all these processes the free carboxyl groups of the resin are converted to $COONH_4$ or salt groups which render the resin soluble and from which the nitrogen is removed by formaldehyde. These known treatments of the resin with aqueous ammonia and formaldehyde do not yield a soluble resin of lower acidity.

This invention has as an object the preparation of soluble polyhydric alcohol-polybasic acid resins of low acidity. A further object is the production of resins of low acid number which retain the desirable properties of polyhydric alcohol-polybasic acid resins as ordinarily prepared and which have no tendency to react with basic pigments. A further object is the manufacture of improved coating compositions. Still further objects are the preparation of new and useful compositions of matter and processes for making them. Other objects will appear hereinafter.

These objects are accomplished by converting the unesterified carboxyl groups of a preformed polyhydric alcohol-polybasic acid resin to amide ($CONH_2$) groups in any suitable manner and thereafter reacting the resin with formaldehyde. One method for converting the free acid groups of the resin to amide groups consists in passing gaseous ammonia into the molten resin until its acid number is lowered to the desired degree, and then removing the excess ammonia from the reaction mixture. The product, which is generally insoluble, is then treated with a small amount of paraformaldehyde. A reaction takes place, consisting possibly in replacement of amido hydrogen atoms by methylol groups, whereby there is formed a resin soluble in the common organic solvents and of much lower acidity than the original resin.

In carrying out my process, the polybasic acid-polyhydric alcohol resin, the acidity of which it is desired to reduce, is first heated to a temperature sufficiently high to cause amide rather than salt formation. This temperature should be at least 150° C. and it is preferably in the neighborhood of 175° C. A slow stream of ammonia is then passed into the molten resin for several hours, or until the acid number of the resin has been reduced to the desired point. During this operation water is eliminated showing that the free acid groups in the resin are converted to amide groups either directly or through intermediate formation and dehydration of the ammonium salt. The ammonia treatment produces a gradual decrease in the solubility of the resin due presumably to the fact that the amide groups being introduced impart decreased solubility in the usual resin solvents. When the acid number has fallen to the desired degree, the ammonia treatment is discontinued and unchanged ammonia removed by blowing with an inert gas for a short time. At this point a cooled sample will generally be opaque and imperfectly soluble in organic solvents though it is still fusible and definitely not gelled. A small amount of paraformaldehyde is then introduced and heating is resumed at 100–150° C. until a test portion remains clear and homogeneous on cooling. The resulting resin is soluble in common organic solvents. The acidity will be negligible if the ammonia treatment has been carried to the limit. The resin is stable and may be used directly in the preparation of coating compositions.

The polybasic acid-polyhydric alcohol resin is most conveniently prepared and reacted with ammonia and formaldehyde in the same reaction vessel. That is, the preparation of the initial resin and its subsequent treatment to reduce its acidity may be carried out as a continuous operation.

My invention may be illustrated by the following examples:

Example I

A mixture of 82.2 g. of phthalic anhydride, 36.4 g. of glycerol, and 81.4 g. of castor oil was heated for about 1.5 hours at 200° C. in a closed flask equipped with a stirring device and thermometer, a slow stream of carbon dioxide being passed through the reaction mixture to exclude air and to remove the water formed in the reaction. The acid number of the pale straw-colored reaction product was 44. A slow stream of ammonia gas was then passed into the mixture, the temperature being maintained at 175–180° C. At the end of two hours the acid number was 23 and after three hours it was 16. At this point excess ammonia was removed by passing nitrogen through the melt for about one-half hour. Five g. of paraformaldehyde was then added and the mixture heated at 120–130° C. for one-half hour with stirring. The cooled product was a soft clear resin, soluble in organic solvents, with an acid number of 16. A solution of this resin was found to tolerate basic pigments, as is shown by the following experiment:

A mixture of 50 g. of a 35% solution in toluol of this resin and 35 g. of zinc oxide was ground in a ball mill for approximately 48 hours. Another grind was prepared in the same manner using a resin (acid number 44) prepared exactly like the one described except that it was not treated with ammonia and formaldehyde. The grind containing the untreated resin was so badly livered that it could not be poured, whereas the grind containing the treated resin was in good condition and could be poured without difficulty.

By blending equal parts by weight of the ammonia-formaldehyde-treated resin prepared as described above with low-viscosity nitrocellulose such as is used in making lacquers, using the usual nitrocellulose solvents, a lacquer was prepared from which excellent homogeneous dry films were cast.

Example II

Two hundred g. of a 35% linseed oil-modified phthalic anhydride-glycerol resin having an acid number of 57.7 was heated to about 155° C. in a reaction vessel equipped with a stirrer, thermometer, and an inlet tube. Ammonia was passed into the reaction mixture for about 50 minutes. Excess ammonia was then removed by passing carbon dioxide through the reaction mixture. The acid number at this point was 24. The temperature was then dropped to 120° C., 3 g. of paraformaldehyde was added, and heating continued at 120–130° C. for 1.5 hours. The acid number of the product was found to be 17 and it could be dissolved in toluol to form a solution containing only small traces of insoluble matter, readily removable by filtration. Grinds of portions of this resin before and after the treatment with ammonia and formaldehyde were made with zinc oxide as in Example I. After 24 hours the grinds were examined. The grind containing untreated resin was very viscous and was slightly livered whereas the grind containing the treated resin was considerably less viscous and was not livered at all.

Example III

A 30% oil modified resin was prepared as follows: A mixture of 137.4 g. of glycerol, 180 g. of coconut oil, and 0.02 g. of litharge was heated at about 250° C. for approximately one hour. Three hundred twenty-four and six-tenths grams of phthalic anhydride was added, and the mixture was heated at 210–215° C. for approximately 2.75 hours, when the acid number was found to be 58. Four hundred twenty-five grams of this resin was heated to 180–185° C. in a flask in an atmosphere of nitrogen. Gaseous ammonia was then passed into the hot molten resin for about 2.5 hours. After blowing the reaction mixture with nitrogen to remove unreacted ammonia the acid number was found to have dropped to 13. Three hundred twenty-five grams of this ammonia-treated resin was heated to 120° C. and 8 g. of paraformaldehyde was added in small portions with stirring. The originally opaque reaction mixture cleared rapidly as the formaldehyde was added. After heating one hour at 120–125° C., the mixture remained clear when cooled and had an acid number of 14. The product dissolved in a toluol-butyl acetate mixture and a trace of insoluble residue was removed by filtration. Forty-eight hour ball mill grinds of this solution with zinc oxide produced no livering or appreciable increase in viscosity.

Example IV

A 40% oil modified resin was prepared as follows: One hundred ninety-six and five-tenths grams of glycerol, 400 g. of coconut oil and 0.04 g. of litharge were heated together with stirring at 250° for 1.5 hours. Four hundred forty-six grams of phthalic anhydride was then added cautiously with stirring and heating was continued at 210–215° C. for about 5 hours. The acid number of the resulting resin was 36.8. It was cooled to 180° C. and ammonia gas was passed for about 2 hours, after which time the acid number had fallen to 11.4. A cooled sample removed at this point was a solid opaque mass. The resin was then cooled to 120° C. and was treated with 1.5% of paraformaldehyde, based upon the weight of the original ingredients. After heating for 25 minutes at 120° C., a cooled sample of the reaction mixture was clear and homogeneous. The resin was cut 50% in toluene. After standing overnight, a small amount of solid matter separated from the originally clear solution. This was removed by filtration. The acid number of the final resin solution was 3.5, equivalent to 7.0 for the solid resin. A serviceable enamel was prepared from this resin by grinding 32 g. of the resin in a ball mill for 48 hours with 70 g. of zinc oxide and 42 g. of toluol, then adding a solution of 8 g. of lacquer type nitrocellulose in 58 g. of lacquer solvents. The viscosity of the resulting enamel was 18 seconds as measured in a No. 10 cup. The resin was neutral to zinc oxide both on grinding and in storage.

Example V

A 40% modified resin was prepared as follows: A mixture of 150 g. of China-wood oil, 450 g. of linseed oil, and 200 g. of glycerol was heated with stirring to 195° C. Seventy-five hundredths gram of litharge was added and the mixture heated at 225° C. for 1⅓ hours. Nine and forty-seven hundredths grams of glycerol and 696 g. of phthalic anhydride were added, and heating continued at 225° C. for about 2 hours. The acid number of the resulting resin was 56.8. Ammonia gas was then passed in at 185–190° C. for approximately 2 hours. The acid number after removal of excess ammonia by blowing the hot reaction mixture with nitrogen was 11.8. One thousand grams of this ammonia treated resin was heated with 30 g. of paraformaldehyde at 120–130° C. for one hour. The resulting product was clear when cold and had an acid number of 9.5. A 57% solution of the resin in toluol after filtering to remove some insoluble matter produced clear, tack-free films when flowed over glass or steel and heated at 135° C. for one hour. A ball mill grind of 20 g. of the resin and 35 g. of zinc oxide in 34 g. of toluol showed no tendency to liver or body either initially or upon storage. Baked films of this composition over steel had excellent water resistance and good durability.

The examples illustrate the use of oil modified phthalic anhydride-glycerol resins since these are the most commonly used resins of this type, but my process is also applicable to any polybasic acid-polyhydric alcohol resin containing an appreciable number of free caryboxyl groups. I may, for example, use resins prepared from other polyhydric alcohols such as glycol, sorbitol, diethylene glycol, monoethylin, etc., and from other acids or acid anhydrides such as maleic, malic, succinic, polymethacrylic, etc.

Since soluble long-oil polybasic acid-polyhydric alcohol resins of low acidity can be obtained without undue difficulty, it is not generally necessary or advisable to use my process in connection with such resins, but as already mentioned, it is especially useful in connection with short-oil polybasic acid-polyhydric alcohol resins which are made with less than 50% by weight of oil. As is well known in the art, oil modified resins may also be made by using in the known manner the separated oil acids instead of the oil itself as in the examples, and this reference to a 50% oil modified resin therefore is intended to mean a resin containing 50% oil irrespective of whether made from the oil itself or from the oil acids in conjunction with the requisite additional amount of glycerol.

Gaseous formaldehyde can be substituted for paraformaldehyde; it is, however, more convenient to use the latter form of formaldehyde.

Any one or all of the steps of the present process can be conducted in the presence of high-boiling non-reactive solvents such as high-boiling aromatic hydrocarbons, or at superatmospheric pressures. However, such expedients are not as a rule either necessary or desirable.

Since my process is a convenient method for lowering the acidity of polybasic acid-polyhydric alcohol resins to any desired degree, the amount of ammonia used will accordingly depend upon the properties of the resins desired. An excess of ammonia does no harm since it can be removed readily by blowing the molten resin with an inert gas such as nitrogen or carbon dioxide.

The proportions of formaldehyde required will vary with the quantity of ammonia which combines with the resin, which in turn depends upon the fall in acidity. Generally speaking, from 1–5% of paraformaldehyde is preferred, but the invention is not limited to these proportions. A general rule for the amount of formaldehyde required is to use substantially the minimum quantity which will convert the ordinarily opaque, insoluble ammonia-treated resin into a clear, homogeneous, soluble resin when cooled.

The usual reaction temperatures are used in the preparation of the polybasic acid-polyhydric alcohol resins which are used in this process; during the treatment of this resin with ammonia and formaldehyde, the reaction temperatures may be varied over considerable limits and ordinarily, but not necessarily, range from 150–200° C., as illustrated in the examples. The only requirement is that the temperature be sufficiently high to convert the acid groups of the resins to amide groups and thereafter to insure reaction of the formaldehyde with the insoluble intermediate product containing amide groups.

In the present process the ammonia reacts with the free carboxyl groups in the resin, forming amides and/or imides, the resin thereby being rendered insoluble in ordinary solvents. The subsequent treatment with formaldehyde converts this insoluble resin to a more soluble and compatible form. It is probably that the amide groups formed by reaction of the resin with ammonia react with formaldehyde to form methylolamide groups. Resins containing these methylolamide groups not only have lower acidity than the original resins, but are soluble in the usual polybasic acid-polyhydric alcohol resin solvents.

The resins of this invention are highly useful wherever ordinary polybasic acid-polyhydric alcohol resins find application. They are especially useful in pigmented coating compositions in which the untreated polybasic acid-polyhydric alcohol resins from which they are derived could not be employed because of their tendency to cause bodying or livering of the coating compositions by reaction with the basic pigments which may be used therein. Mixed or blended with other resins, either natural or synthetic, cellulose derivatives such as nitrocellulose and cellulose acetate, vegetable and animal fats and oils, waxes, pigments, colors, dyes, solvents, etc., they are highly useful for coating compositions for all types of surfaces such as metals, wood, glass, fabrics, paper, stone, concrete, brick, and the like. My new resins also find use in molding compositions and as adhesives.

The advantages of the process described herein will be apparent from the foregoing description. The process makes possible for the first time the preparation of short-oil polybasic acid-polyhydric alcohol resins of low acidity which have good color, are water resistant and are soluble in the usual organic solvents for such resins, and it does this without sacrificing the valuable properties of the original resins. The resins produced according to this invention are soluble in the same solvents as the polybasic acid-polyhydric alcohol resins from which they are derived. When properly prepared, they are usually no darker in color than the original resins. They also have substantially the same water resistance as the original resins, and better water resistance than resins prepared by using excess polyhydric alcohol. The process is extremely advantageous not only in that it utilizes the very cheap materials ammonia and formaldehyde, but also because it is very simple, requires no expensive apparatus or control, and adds very little to the cost of the resin. The process described herein is highly useful for making soluble polybasic acid-polyhydric alcohol resins which because of their low acidity, are superior to ordinary polybasic acid-polyhydric alcohol resins for making stable non-livering coating compositions.

As many apparently widely different embodiments of this invention may be made without departing from the spirit and scope thereof, it is to be understood that I do not limit myself to the specific embodiments thereof except as defined in the appended claims.

I claim:

1. A synthetic resin of low acid number and soluble in organic solvents which comprises the product obtained by reacting formaldehyde with an organic solvent-insoluble polyhydric alcohol-polycarboxylic acid resin a substantial proportion of whose unesterified carboxyl groups have been converted to $CONH_2$ groups, said reaction being continued until the insoluble resin is converted to a clear homogeneous soluble resin when cooled.

2. A synthetic resin of low acid number and soluble in organic solvents which is obtained by reacting an organic solvent-soluble polyhydric alcohol-polycarboxylic acid resin having free acid groups with gaseous ammonia at a temperature of at least 150° C. until a substantial proportion of the free carboxyl groups have reacted therewith and the product is insoluble in the usual resin solvents, and reacting the product thereby obtained with formaldehyde until the insoluble resin is converted to a clear homogeneous soluble resin when cooled.

3. A synthetic resin of low acid number and soluble in organic solvents which is obtained by reacting an organic solvent-soluble polyhydric alcohol-polycarboxylic acid resin having free acid groups with gaseous ammonia at a temperature of at least 150° C. until a substantial proportion of the free carboxyl groups have reacted therewith and the product is insoluble in the usual resin solvents, and reacting the product thereby obtained with formaldehyde until the insoluble resin is converted to a clear homogeneous soluble resin when cooled, said polyhydric alcohol-polycarboxylic acid resin being modified by fatty oil in an amount not exceeding 50% by weight of the resin.

4. A process for making resins of low acid number soluble in organic solvents which comprises reacting formaldehyde with an organic solvent-insoluble polyhydric alcohol-polycarboxylic acid resin a substantial proportion of whose unesterified carboxyl groups have been converted to $CONH_2$ groups, said reaction being continued until the insoluble resin is converted to a clear homogeneous soluble resin when cooled.

5. A process which comprises heating molten organic solvent-soluble polyhydric alcohol-polycarboxylic acid resin with ammonia gas at a temperature of at least 150° C. until a substantial proportion of the free carboxyl groups have reacted therewith and the product is insoluble in the usual resin solvents, and heating the product thus obtained with formaldehyde until the insoluble resin is converted to a clear homogeneous soluble resin when cooled.

6. A process which comprises heating molten polyhydric alcohol-polycarboxylic acid resin containing free acid groups with ammonia gas at a temperature of at least 150° C. until a substantial proportion of the free carboxyl groups have reacted therewith and the product is insoluble in the usual resin solvents, and heating the insoluble product thus obtained with a small amount of formaldehyde until the insoluble ammonia treated resin is converted into a clear, homogeneous, soluble resin when cooled.

7. A process which comprises heating molten polyhydric alcohol-polycarboxylic acid resin containing free acid groups with ammonia gas at a temperature of about 150° C. to 200° C. until a substantial proportion of the free carboxyl groups have reacted therewith and the product is insoluble in the usual resin solvents, and heating the insoluble product thus obtained with a small amount of formaldehyde at a temperature of about 100° C. to 150° C. until the insoluble ammonia treated resin is converted into a clear, homogeneous, soluble resin when cooled.

8. A process which comprises heating molten polyhydric alcohol-polycarboxylic acid resin containing free acid groups with ammonia gas at a temperature of at least 150° C. until a substantial proportion of the free carboxyl groups have reacted therewith and the product is insoluble in the usual resin solvents, and heating the insoluble product thus obtained with a small amount of formaldehyde until the insoluble ammonia treated resin is converted into a clear, homogeneous, soluble resin when cooled, said polyhydric alcohol-polycarboxylic acid resin being modified by fatty oil in an amount not more than 50% by weight of the resin.

9. The synthetic resin obtained as set forth in claim 3 in which said polyhydric alcohol-polycarboxylic acid resin is a glycerol-phthalic anhydride resin.

10. The process set forth in claim 8 in which said polyhydric alcohol-polycarboxylic acid resin is a glycerol-phthalic anhydride resin.

HENRY S. ROTHROCK.